Patented Aug. 1, 1939

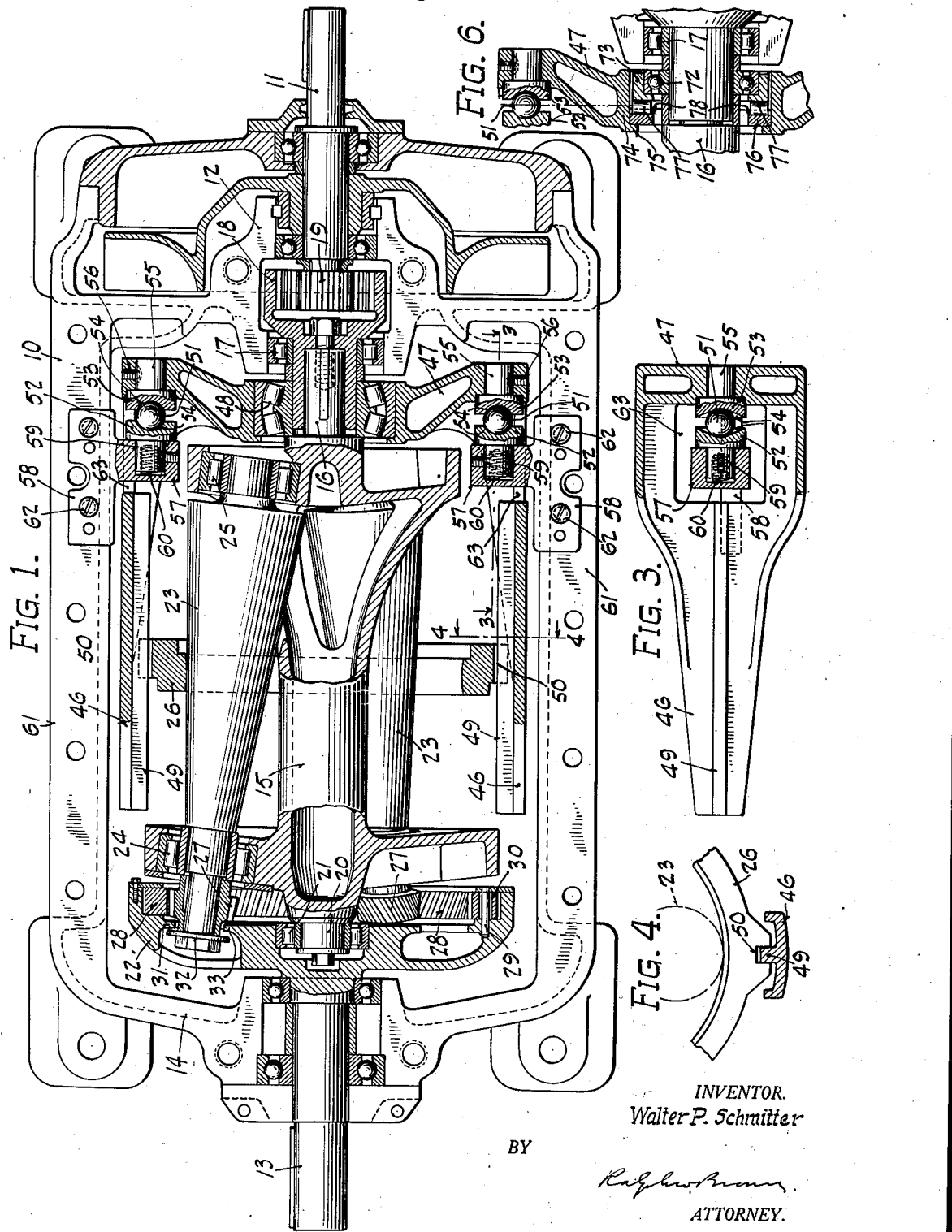

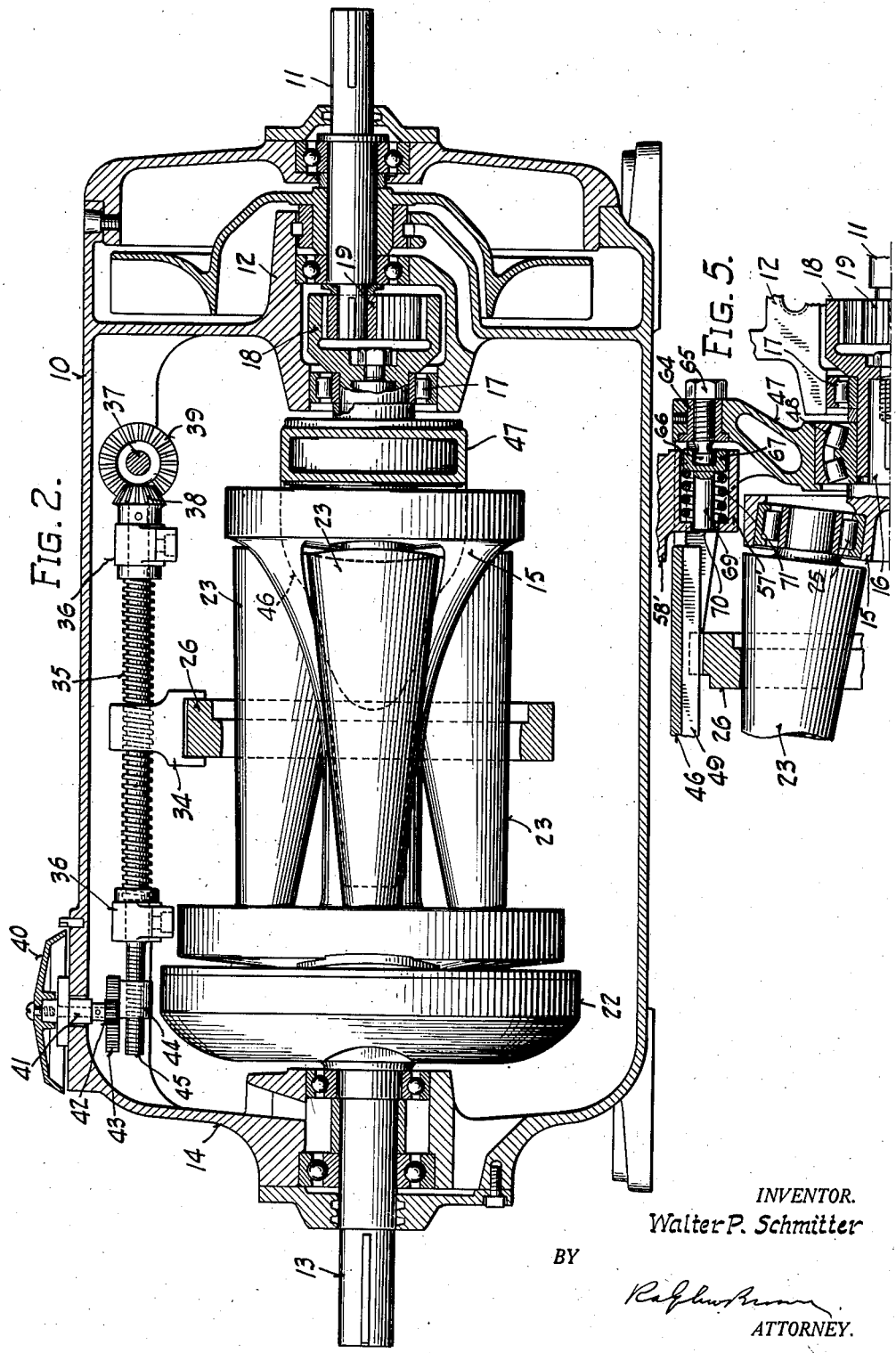

2,168,274

UNITED STATES PATENT OFFICE 2,168,274

VARIABLE SPEED TRANSMISSION

Walter P. Schmitter, Milwaukee, Wis., assignor to The Falk Corporation, Milwaukee, Wis., a corporation of Wisconsin Application August 4, 1937, Serial No. 157,261

18 Claims. (Cl. 74—281)

This invention relates to variable speed transmissions of the type involving a plurality of relatively inclined tapered planet rollers whose motions are controlled by an element contacting the rollers and moveable lengthwise thereof.

In my copending applications, Serial No. 121,119, filed January 18, 1937 and Serial No. 153,607, filed July 14, 1937, I have disclosed transmissions of this type in which the control element is in the form of a ring encircling the rollers and in which the rollers are urged into pressure contact with the ring by pressure inducing means which functions in response to the torque load on the ring.

In the earlier of the above named applications, each roller is fulcrumed at one end in a rotary carrier and is urged to swing outward relative thereto into pressure contact with the ring, whereas in the latter the rollers are urged bodily outward into pressure contact with the ring by a spreading or wedge-like action of the carrier induced by an axial thrust imposed on the carrier. In both applications, however, the pressure inducing means is engaged with the ring only at one side of the center thereof, thereby imposing an eccentric load on the ring and a consequent unbalanced or unstable condition or reaction between the rollers and ring.

One object of the present invention is to provide an improved pressure inducing device de30 signed to respond to the torque load on the ring or control element without imposing an unbalanced load on the ring.

Other more specific objects and advantages will appear, expressed or implied, from the following description of a variable speed transmission constructed in accordance with the present invention.

In the accompanying drawings:

Figure 1 is a horizontal sectional view of a variable speed transmission embodying the present invention.

Fig. 2 is a vertical sectional view.

Fig. 3 is a sectional view on the line 3—3 of Fig. 1.

Fig. 4 is a sectional view on the line 4—4 of Fig. 1.

Fig. 5 is a fragmentary sectional view of a modified form of pressure inducing device.

Fig. 6 is a similar view of another modified form of pressure inducing device.

The variable speed transmission selected for illustration is quite similar in many respects to the transmission disclosed in the copending application last above identified. It includes a horizontally split housing 10 with a drive shaft 11 journalled in and projecting from one end 12 thereof and a driven shaft 13 journalled in and projecting from the other end 14 thereof. It also includes a spool-shaped rotor 15 supported at one end by an integral stub shaft 16, journalled in a bearing 17, and carrying an internal gear 18 5 meshing with a driving pinion 19 on the drive shaft 11. The rotor shown is also supported at the other end by an integral stub shaft 20, journalled in a bearing 21 in a disk 22 carried by the driven shaft 13.

The rotor 15 constitutes a carrier for a plurality of tapered planet rollers 23, each being journalled in bearings 24 and 25 in the rotor to rotate in planetary fashion with the rotor and also about an axis inclined with respect to the rotor axis, the taper of each roller 23 and its inclination being such that the outer extremities of the roller surfaces are substantially parallel to the axis of the rotor. Planetary movements of the several rollers are controlled by a non-rotating encircling ring 26 in contact therewith and axially movable lengthwise thereof. Each of the rollers 23 carries a planet pinion 27 fixed to one end thereof and meshing with a driven internal gear 28 carried by the disk 22.

In this instance the gear 28 is connected to the disk 22 through a single pin 29 engaged in a radial slot 30 formed in the gear 28, so that the gear 28 is free to move radially in any direction to equalize the pressure reactions between it and the several pinions 27, substantially as disclosed in the copending application last above identified.

In this instance also the rotor supporting bearings 21 and 17, and the roller supporting bearings 24 and 25, are all axially adjustable so as to permit free axial movement of the rotor 15 relative to the housing 10 and to the rollers 23, the rotor 15 reacting through the bearings 24 and 25 to spread the several rollers 23 against the encircling ring 26 by movement of the rotor toward the right. A ring 31 on the disk 22 coacts with collars 32 on the ends of the rollers 23 to restrain the latter against movement toward the right, and a ring 33 on the disk 22 coacts with the end faces of the pinions 27 to resist movement of the rollers 23 toward the left.

The ring 26 is shifted along the rollers 23 and its position controlled by appropriate means such as a nut 34, forked to loosely embrace a peripheral portion of the ring, and threaded on a screw shaft 35, journalled in suitable brackets 36 mounted in the top of the housing 10. The screw shaft 35 is actuated and controlled from a point externally of the housing through a shaft 37 and suitable gears 38 and 39.

The transmission shown is equipped with an appropriate indicator in the form of a disk 40, carried by a stub shaft 41 journalled in the top of the housing 10, and so geared to the control shaft 35 that the nut 34 may travel throughout its complete range of movement while the disk 40 makes not more than one complete turn. The gearing for this purpose comprises a pinion 42 on the shaft 41, the pinion 42 engaging a rack 43 on a nut 44 threaded on a screw extension 45 of the shaft 35.

It will be noted that the nut 34 does not interfere with free radial movement of the ring 26 so that the ring is free at all times to center itself relative to the roller group. It will also be noted that the nut 34 offers no resistance to rotation of the ring, the ring being restrained against rotation by separate means, which latter does not interfere with adjustment of the ring along the rollers under the action and control of the nut 34. The novel means herein-disclosed for restraining the ring 26 against rotation is so designed as to avoid imposing an eccentric load on the ring and thereby avoiding all interference with the desirable free-centering function of the ring. An embodiment of that means, shown in Figs. 1, 3, and 4, will now be described.

It comprises a yoke having two spaced parallel arms 46 rigidly connected at one end by an integral cross-arm structure 47 which latter is rockably supported midway of its ends upon the rotor stub shaft 16 through a spherical bearing 48 fixed to the stub shaft. The arms 46 are loosely interlocked with the ring 26 at diametrically opposite points on the ring in a manner to prevent rotation of the ring relative to the yoke and at the same time to permit free movement of the ring crosswise of the yoke as well as lengthwise of the arms 46 and rollers 23. For this purpose the arms 46 are provided with central longitudinal ribs 49 respectively engaged loosely in slots 50 provided at diametrically disposed points on the exterior of the ring 26, these ribs 49 and coacting slots 50 constituting flexible and axially yieldable torque transmitting connections between the ring 26 and the yoke 46. The ring 26 is thus free to travel along the ribs 49 and to move toward and from the ribs, and due to the fact that the yoke and arms 46 are rockably supported the ring is of course also free to move with the ribs 49 in a direction transversely of the ribs.

Provision is made for preventing the yoke, with its arms 46, from rotating about the axis to the ring 26 so as to hold the ring against rotation. The means for this purpose, shown in Figs. 1 and 3, includes a camming device designed to utilize the rotative effort of the ring 26 to impose an end thrust on the roller carrier 15 in such direction as to force the rollers 23 against the ring 26. The camming device shown includes two balls 51, each interposed between a stationary element 52 and an element 53 carried by and moveable with an end of the cross-arm 47, the balls 51 being seated in and confined by coacting cam grooves 54 formed in the opposed faces of the elements 52 and 53.

In this instance each element 53 is in the form of a disk seated in the cross-arm 47 and having an integral stem 55 locked against rotation by a set screw 56; and each of the other elements 52 is also in the form of a disk seated against the hollow boss 57 of a stationary bracket plate 58 and having an integral hollow stem 59 similarly locked against rotation. A spring 60 within the hollow stem 59 of element 52 reacts against the interior of the boss 57 to keep the elements 52 and 53 and interposed ball in close contact. Each bracket plate 58 is shown countersunk in the flange 61 of the lower half of the housing 10 and securely anchored by suitable means such as screws 62. Each arm 46 is provided with a suitable opening 63 adjacent its juncture with the cross-arm 46 to accommodate the boss 57, as well as the camming elements 52 and 53 and interposed ball 51.

The arrangement is such that any rotative effort imparted from the ring 26 through the arms 46 to the cross-arm 47 tends to displace the elements 53 laterally with respect to the elements 52, causing the balls 51 to react on their coacting cam grooves 54 to force the elements 53 and cross-arm 47 away from the stationary elements 52, and thereby causing the cross-arm 47 to impose an axial thrust on the shaft 16 and roller carrier 15 in a direction to urge the carrier toward the right. As above pointed out, the carrier 15, thus urged, reacts through the bearings 24 and 25 to force the rollers 23 outwardly against the ring. The parts just referred to thus function in response to the torque load upon the ring 26 to develop contact pressures between the rollers 23 and ring proportional to the torque load on the ring.

In the arrangement partially shown in Fig. 5, a similar yoke, with its parallel arms 46 and cross-arm 47 similarly mounted on the shaft 16 of the roller carrier 15, functions to resist rotation of the control ring and also to maintain predetermined contact pressures between the rollers 23 and ring, regardless of the magnitude of the torque load on the ring. In this instance an internally threaded bushing 64 with a screw 65 threaded therein has been mounted in each end of the cross-arm 47, in place of the cam elements 53 hereinabove described, the inner end of each screw having a head formation 66 engaged in and bearing against a socketed plug 67 slidably mounted within the hollow boss 57' of a bracket 58', which has been substituted for the bracket 58 and cam element 52 hereinabove described. Each plug 67 is preferably provided with an integral stem 69 guided in an orifice 70 in the boss 57', and a compression spring 71 surrounding each stem 69 maintains an outward pressure on each plug 67 and screw 65 to force the cross-arm 47 of the yoke toward the right.

The arrangement is such that the interlocking engagement between each screw 65 and the coacting socketed plug 67 in the stationary boss 57' prevents rotation of the yoke, with its arms 46, and thus prevents rotation of the ring 26, but the cross-arm 46 of the yoke, and consequently the roller carrier 15, are urged by the springs 71 in such direction as to maintain predetermined contact pressures between the rollers 23 and control ring. The magnitude of these contact pressures is of course determined by the tension in the springs 71 and may be regulated by adjustment of the screws 65 in their bushings 64.

In Fig. 6 I have shown a modified means for mounting the cross-arm 47 of the yoke. The arrangement therein illustrated includes a thrust sustaining anti-friction bearing 72, fixed to the rotor shaft 16, and carrying a thrust collar or ring 73. The arm 47 is provided with a central hub 74 surrounding the collar 73 and radially spaced therefrom, the hub having an inwardly directed end flange 75 forming a seat for a thrust collar 76 fixed within the hub. Two axially aligned radially extending rollers 77 within the hub 74 are fitted in radial recesses 78 formed in the collar 76 and bear against the collar 73 in a manner to provide a fulcrum on which the yoke, with its cross-arm 47, is free to tilt.

The cross-arm 47, shown in Fig. 6, is equipped with camming elements 53 at its opposite ends which coact with balls 51 and stationary camming elements 52 in the manner above described to force the arm 47 toward the right in response to the torque load on the control ring 26. This force is transmitted through the rollers 77 to and through the collar 73 and bearing 72 to urge the roller carrier and its shaft 16 toward the right in the manner and for the purpose above described. The rollers 77 also coact with the collars 76 and 73 to permit the cross-arm 47 to tilt but only about an axis which passes through the camming balls 51.

Various other changes may be made in the embodiment of the invention hereinabove specifically described without departing from or sacrificing the advantages of the invention as defined in the appended claims.

I claim:

1. In a variable speed transmission the combination of a plurality of tapered rollers mounted to revolve in planetary fashion about a central axis with their longitudinal axes inclined relative to said axis, an encircling ring contacting said rollers and moveable lengthwise of the latter to regulate their motion, and means including a longitudinally extended structure tiltable about said central axis and engaged with said ring for sustaining the torque load on said ring.

2. In a variable speed transmission the combination of a plurality of tapered rollers mounted to revolve in planetary fashion about a central axis with their longitudinal axes inclined relative to said central axis, encircling means contacting said rollers and moveable lengthwise of the latter to regulate their motion, and means for sustaining the torque load on said encircling means, said sustaining means including a longitudinally extended structure tiltable relative to said central axis, and a plurality of torque transmitting connections between said encircling means and structure.

3. In a variable speed transmission, the combination of a plurality of tapered rollers mounted to revolve in planetary fashion about a central axis with their longitudinal axes inclined relative to said central axis, encircling means contacting said rollers and moveable lengthwise of the latter to regulate their motion, and means for sustaining the torque load on said encircling means comprising a structure extending lengthwise of said rollers and supported at one end to tilt relative to said central axis, and a plurality of torque transmitting connections between said structure and said encircling means, said connections being yieldable to permit free movement of said encircling means lengthwise of said structure and rollers.

4. In a variable speed transmission, the combination of a plurality of tapered rollers mounted to revolve in planetary fashion about a central axis with their longitudinal axes inclined relative to said central axis, encircling means contacting said rollers and moveable lengthwise thereof to regulate their motion, and means for sustaining the torque load on said encircling means comprising a structure extending lengthwise of said rollers and supported at one end to tilt relative to said central axis, and a plurality of torque transmitting connections between said structure and said encircling means, said connections being flexible to permit free movement of said encircling means both transversely and lengthwise of said central axis.

5. In a variable speed transmission, the combination of a plurality of tapered rollers mounted to revolve in planetary fashion about a central axis with their longitudinal axes inclined relative to said central axis, encircling means contacting said rollers and moveable lengthwise thereof to regulate their motion, means for sustaining the torque load on said encircling means comprising a structure extending lengthwise of said rollers, and a pair of torque transmitting flexible connections between said encircling means and structure, said connections being disposed adjacent diametrically opposite points on said encircling means so as to avoid imposing and unbalanced transverse load thereon.

6. In a variable speed transmission, the combination of a plurality of tapered rollers mounted to revolve in planetary fashion about a central axis with their longitudinal axes inclined relative to said axis, a ring encircling and contacting said rollers and moveable lengthwise thereof to regulate their motion, said ring also being freely moveable transversely of said central axis to equalize the contact pressures between said rollers and ring, a means for sustaining the torque load on said ring comprising a structure extending lengthwise of said rollers, and means including a plurality of flexible torque transmitting connections between said ring and structure, said connections being symmetrically disposed with respect to said ring to avoid disturbing the equalized pressures between said rollers and ring.

7. In a variable speed transmission, the combination of a plurality of tapered rollers mounted to revolve in planetary fashion about a central axis with their longitudinal axes inclined relative to said axis, a ring encircling and contacting said rollers and moveable lengthwise thereof to regulate their motion, said ring also being freely moveable transversely of said central axis to equalize the contact pressures between said rollers and ring, and means for sustaining the torque load on said ring without disturbing the equalized pressures between said rollers and ring, said last named means including a structure extending lengthwise of said rollers, and a plurality of flexible torque transmitting connections between said ring and structure.

8. In a variable speed transmission, the combination of a plurality of tapered rollers mounted to revolve in planetary fashion about a central axis with their longitudinal axes inclined relative to said axis, encircling means contacting said rollers and movable lengthwise thereof to regulate their motion, a structure disposed concentrically of said encircling means and in torque transmitting engagement therewith, pressure inducing means for forcing said rollers into pressure contact with said encircling means, and means coacting with said structure and with said pressure inducing means to energize the latter.

9. In a variable speed transmission, the combination of a plurality of tapered rollers mounted to revolve in planetary fashion about a central axis with their longitudinal axes inclined relative to said axis, encircling means contacting said rollers and moveable lengthwise thereof to regulate their motion, means including a device disposed concentrically of said encircling means and engaged with the latter to sustain the torque load thereon, pressure inducing means associated with said device for forcing said rollers into pressure contact with said encircling means, and resilient means acting on said device for energizing said pressure inducing means.

10. In a variable speed transmission, the combination of a plurality of tapered rollers mounted to revolve in planetary fashion about a central axis with their longitudinal axes inclined relative to said axis, encircling means contacting said rollers and moveable lengthwise thereof to regulate their motion, a device disposed concentrically of said encircling means and in torque transmitting engagement therewith, pressure inducing means for forcing said rollers into pressure contact with said encircling means, and cam means energized by the torque load on said device for energizing said pressure inducing means.

11. In a variable speed transmission, the combination of a plurality of tapered rollers mounted to revolve in planetary fashion about a central axis with their longitudinal axes inclined relative to said axis, encircling means contacting said rollers and moveable lengthwise thereof to regulate their motion, said encircling means being urged by said rollers to rock about said central axis, means connected to said encircling means to rock as a unit therewith, and means energized by the torque load on said last named means for forcing said rollers into pressure contact with said encircling means.

12. In a variable speed transmission, the combination of a plurality of tapered rollers mounted to revolve in planetary fashion about a central axis with their axes inclined relative to said axis, encircling means contacting said rollers and moveable lengthwise thereof to regulate their motion, pressure inducing means for forcing said rollers into pressure contact with said encircling means, and means including a plurality of circumferentially spaced connections with said encircling means for energizing said pressure inducing means.

13. In a variable speed transmission, the combination of a plurality of tapered rollers mounted to revolve in planetary fashion about a central axis with their longitudinal axes inclined relative to said axis, encircling means contacting said rollers and moveable lengthwise thereof to regulate their motion, a yoke rockable about said central axis and having a plurality of arms in torque transmitting engagement with said encircling means, and means energized by the torque load on said yoke structure for inducing pressure contact between said rollers and said encircling means.

14. In a variable speed transmission, the combination of a plurality of tapered rollers mounted to revolve in planetary fashion about a central axis with their longitudinal axes inclined relative to said axis, encircling means contacting said rollers and moveable lengthwise thereof to regulate their motion, a yoke rockable about and tiltable with respect to said central axis and having torque transmitting flexible connections with said encircling means, and means actuated by said yoke for inducing pressure contact between said rollers and said encircling means.

15. In a variable speed transmission, the combination of a plurality of tapered rollers mounted to revolve in planetary fashion about a central axis with their longitudinal axes inclined relative to said axis, encircling means engaging said rollers and moveable lengthwise thereof to regulate their motion, means for inducing pressure contact between said rollers and encircling means, a yoke rockable about and shiftable along said axis and having torque transmitting engagement with said encircling means, and cam means coacting with said yoke for energizing said pressure inducing means.

16. In a variable speed transmission, the combination of a plurality of tapered rollers mounted to revolve in planetary fashion about a central axis with their longitudinal axes inclined relative to said axis, a non-rotating yoke having arms extending lengthwise of said rollers, and radially moveable means encircling and contacting said rollers to control their motion, said means being engaged with said arms to hold said means against rotating while permitting the latter to move lengthwise of said arms and rollers.

17. In a variable speed transmission, the combination of a plurality of tapered rollers mounted to revolve about a central axis with their longitudinal axes inclined relative to said axis, a yoke having a pair of arms extending lengthwise of said rollers and mounted to swing about an axis transverse to said central axis and substantially within the common central plane of said arms, means encircling and contacting said rollers to control their motion, and loose connections between said means and arms to resist rotation of said means and to permit movement of said means both transversely and lengthwise of said central axis.

18. In a variable speed transmission, the combination of a plurality of rollers mounted to revolve in planetary fashion about a central axis with their longitudinal axes inclined relative to said axis, means encircling and contacting said rollers and moveable lengthwise thereof to regulate their motion, a yoke rockable about said central axis and having a pair of arms extending lengthwise of said axis at opposite sides thereof, torque transmitting connections between said arms and said encircling means, cam devices responsive to rocking action of said yoke about said central axis, and means energized by said cam devices for inducing pressure contact between said rollers and encircling means, said yoke also being rockable about a transverse axis passing through said cam devices.

WALTER P. SCHMITTER.